United States Patent [19]
Weetman

[11] Patent Number: 5,112,192
[45] Date of Patent: May 12, 1992

[54] MIXING IMPELLERS AND IMPELLER SYSTEMS FOR MIXING AND BLENDING LIQUIDS AND LIQUID SUSPENSIONS HAVING A WIDE RANGE OF VISCOSITIES

[75] Inventor: Ronald J. Weetman, Rochester, N.Y.

[73] Assignee: General Signal Corporation, Stamford, Conn.

[21] Appl. No.: 559,126

[22] Filed: Jul. 26, 1990

[51] Int. Cl.⁵ .............................................. B63H 1/00
[52] U.S. Cl. ............................ 416/201 A; 416/223 R; 416/242; 416/243; 416/DIG. 2; 366/330
[58] Field of Search ................... 416/242, 243, 201 A, 416/223 R, DIG. 2, 203, 227 R, 231 A, 231 R, 236 R, 236 A, 231 B; 366/330, 327, 328, 329

[56] References Cited

U.S. PATENT DOCUMENTS

| | | |
|---|---|---|
| D. 226,823 | 5/1973 | Landberg . |
| 33,459 | 10/1861 | Wappich ..................... 416/223 R X |
| 285,212 | 9/1883 | Bell et al. ..................... 416/231 B X |
| 389,430 | 9/1888 | Zeise ................................... 416/223 |
| 914,857 | 3/1909 | Miller ................................. 416/243 |
| 1,372,441 | 3/1921 | Leinweber et al. ................. 416/243 |
| 1,471,590 | 7/1926 | Carter ................................. 416/223 |
| 1,929,823 | 10/1933 | Perlaw ........................ 416/201 A X |
| 1,959,712 | 5/1934 | Flowers ......................... 366/330 X |
| 2,320,733 | 6/1943 | McIntyre ............................ 416/243 |
| 2,390,879 | 12/1945 | Hagen .............................. 416/243 |
| 2,498,170 | 2/1950 | Meier ......................... 416/236 A X |
| 2,896,925 | 7/1959 | Place .......................... 416/201 A X |
| 2,972,382 | 2/1961 | Manzolillo .......................... 416/243 |
| 3,133,728 | 5/1964 | Janke ............................ 366/329 X |
| 4,054,272 | 10/1977 | Cooke ........................... 366/330 X |
| 4,083,653 | 4/1978 | Stiffler ........................... 366/329 X |
| 4,411,598 | 10/1983 | Okada ............................ 416/223 R |
| 4,468,130 | 8/1984 | Weetman . |
| 4,650,343 | 3/1987 | Doom et al. .................... 366/330 X |
| 4,722,608 | 2/1988 | Salzman et al. . |
| 4,802,771 | 2/1989 | Weetman . |
| 4,896,971 | 1/1990 | Weetman et al. ..................... 366/330 |

FOREIGN PATENT DOCUMENTS

| | | |
|---|---|---|
| 2319832 | 10/1973 | Fed. Rep. of Germany ...... 416/236 |
| 2419027 | 11/1974 | Fed. Rep. of Germany ...... 366/330 |
| 258376 | of 1931 | Italy ................................ 416/236 A |
| 275361 | 7/1970 | U.S.S.R. ............................. 366/330 |
| 386551 | 1/1933 | United Kingdom ............ 416/223 R |
| 446852 | 3/1936 | United Kingdom ............ 416/223 R |

OTHER PUBLICATIONS

"Power, Flow and Shear Characteristics of Mixing Impeller," 6th European Conference on Mixing, May 1988, Ronald J. Weetman.

"The Use of Fluid Foil Impellers in Viscous Mixing Applications", AICHE Annual Meeting, Nov. 1989, Ronald J. Weetman.

*Primary Examiner*—Edward K. Look
*Assistant Examiner*—Todd Mattingly
*Attorney, Agent, or Firm*—Martin Lukacher

[57] ABSTRACT

Impellers and impeller systems are described which enable liquids and liquid suspensions to be mixed and blended where the size of the impeller and the viscosity of the liquid may require operation in the turbulent and laminar flow regimes, as well as in the transitional flow regime therebetween. The impellers have a plurality of fluidfoil blades and have camber and twist. The geometric pitch or blade angle increases from the tip of the blade towards their axis of rotation in a manner to provide an over pitched condition so that the pitch ratio of the blades at 40% of the blade radius from the axis is greater than the pitch ratio at the tip. The blades are preferably smoothly tapered and increased in width from the tip towards the axis. The impeller blades are mounted on a hub connected to a drive shaft. The blades may decrease in width where they connect to the hub. The pitch angle at the tip is in the range of 18° to 30° (preferably about 20°). The angle at the tip of two diametrically disposed blades of a four blade impeller may have a different blade angle at the tip than the other pair of blades. A pair of impellers may be used.

32 Claims, 14 Drawing Sheets

MIXING IMPELLERS AND IMPELLER SYSTEMS FOR MIXING AND BLENDING LIQUIDS AND LIQUID SUSPENSIONS HAVING A WIDE RANGE OF VISCOSITIES

DESCRIPTION

The present invention relates to impellers and impeller systems for mixing and blending applications and particularly for mixing and blending liquids and liquid suspensions having a wide range of viscosities such that the flow developed by the impellers and impeller systems can be in the turbulent, the transitional, and the laminar flow regimes.

The invention is especially suitable for use in providing an impeller which is relatively small (e.g., sixteen inch diameter and less) and is adapted for use in portable mixers. Such mixers may encounter liquids and liquid suspensions of various viscosity, and because of their small size, are likely to encounter transitional and laminar flow conditions. The inventive impellers and impeller systems are adapted for efficient mixing and blending so as to minimize power requirements and avoid the need for large motors which would limit portability. The features of the invention in providing efficient flow over a wide range of flow conditions, extending from turbulent, through transitional to the laminar flow regime, and the efficiency of the impellers and impeller systems makes them applicable for other applications where larger sizes may be desirable. The invention, however, affords effective mixing over a large range of flow conditions (viscosity of the medium being mixed) so as to provide complete mixing and blending rapidly with blend times being that of larger conventional impellers used in similar flow regimes and at less power input as compared to such impellers.

The flow regime, in which flow is developed for mixing impellers, depends upon the ratio of inertial forces to viscous forces in the medium (the liquid or liquid suspension confined in a tank or vessel). This ratio is expressed as the mixing Reynolds number and is calculated as follows:

$$N_{Re} = \frac{10.76 \, N_{RPM} D_{in}^2 (SG)}{\mu_{cps}}$$

where SG is the specific gravity of the medium and $\mu_{cps}$ is the viscosity in centipoise. Reynolds numbers are of the order of $2 \times 10^5$ in the turbulent range. Reynolds numbers are from 10 to 1000 in the transitional regime. For Reynolds numbers below 10, the impeller is developing flow in the laminar regime. Normally, flow of water and similar materials of low viscosity is in the turbulent regime. Liquids of the viscosity of light oils are normally caused to flow in the transitional flow regime, when impeller driven. More viscous liquids, such as liquids having the viscosity of glycerine are normally driven to produce mixing Reynolds numbers corresponding to flow in the low end of the transitional flow regime and into the laminar flow regime.

The specific gravity, diameter and speed of the impeller affects the inertial forces, while the viscosity of the medium affects the viscous forces. However, in a small vessel and with a small impeller, the mixing Reynolds number, even for a low viscosity liquids such as light oils, can extend into the transitional flow regime. Thus, with small diameter impellers, for example, three inch diameter, the mixing Reynolds numbers, even with slightly viscous media, are in the transitional and may extend into the laminar flow regimes. Thus, the problems of mixing and blending in the transitional and laminar flow regimes are exacerbated, when small diameter impellers are used.

It is desirable for efficient mixing and rapid blending that the impeller produce axial flow. As the Reynolds number decreases, the media's resistance to flow increases and an axial flow impeller's discharge becomes more radial. In the laminar flow regime, the discharge flow from the impeller is radial. Then, flow on one side (below the impeller in a down pumping impeller) reverses, leaving regions which are not efficiently mixed or blended. In addition, vortices are produced, which move sluggishly if at all, thereby increasing the blending time. See, publication by R. J. Weetman, et al., entitled "The Use of Fluidfoil Impellers in Viscous Mixing Applications", presented at the AICHE annual meeting, San Francisco, Calif., U.S.A., Nov. 5-10, 1989. Axial flow impellers which provide effective and efficient mixing and blending in turbulent flow conditions, such as the impellers described in U.S. Pat. No. 4,468,130 issued Aug. 28, 1984 (the type A310 sold by the Mixing Equipment Company of Rochester, N.Y., USA, ("MIXCO")—a unit of General Signal Corporation); U.S. Pat. No. 4,722,608 (the A6000 sold by MIXCO); U.S. Pat. No. 4,802,771 (the C104 also sold by MIXCO) and U.S. Pat. No. 4,896,971 (the A315 and A320 also sold by MIXCO) have approximately constant pitch or are under pitched in order to maintain a substantially constant angle of attack (the angle which the velocity vector of the media makes with the blade chord). With such axial flow impellers and even with pitch blade turbines (e.g., the MIXCO A200), the flow direction of the impellers discharge becomes radial in the transitional flow regime and is radial in the laminar flow regime. Such impellers operate efficiently (the ratio of flow to input power is high) However, due to the generation of reverse flow and vortices, the blending time increases and blending becomes sluggish or not occur at all, even when the impeller is operated continuously for prolonged periods of time (e.g. of the order of an hour).

It is reasonable to compare an impeller or impeller system with a standard impeller for purposes of measuring its effective blending time. One such axial flow impeller which has long been in use is a constant pitch fluidfoil (with camber and twist) having three blades, 120° apart. The shape of this impeller is similar to that of a conventional marine propulsion propeller. Such a standard impeller is the type A100 also available from MIXCO.

A fluidfoil having twist is characterized by its pitch ratio (PR). The pitch is the distance a point on an impeller blade would move along the axis of rotation of the impeller in the manner of a screw thread while that point moves around the axis for one rotation of the impeller. PR is defined as the ratio of the pitch to the diameter D of the impeller, which is the diameter swept by the tip of the blades.

Mathematically,

PR=Pitch/D, and from the geometry $$PR = \frac{r}{R} \pi \tan \frac{\beta r}{R}$$

where r is the radius from the axis of rotation of the impeller to a section of the blade where PR is determined, R is the radius from the axis to the tip (maximum impeller diameter) and $\beta$ is the pitch or blade angle in degrees.

The pitch or blade angle is defined as the angle which the chord of the blade makes to a plane perpendicular to the axis of rotation of the impeller. The pitch angle is the arc tangent ($\tan^{-1}$) of the pitch ratio divided by the product of $\pi$(pi) and the ratio of the radius at the point where the pitch ratio is measured to the radius from the axis of rotation to the tip. In a constant pitch impeller, the pitch angle is such that the pitch and pitch ratio remains constant from the tip to a point near its base (or the hub) where the blade is connected to the drive shaft. The axis of the shaft is the rotational axis about which the impeller is driven. The diameter is the swept diameter from the axis to the point where the pitch ratio is measured. At the tip, the diameter is the swept diameter of the entire impeller. For typical axial flow impellers, a constant pitch or under pitch, where the pitch ratio near the hub (say at 0.4 R, R being the radius of the impeller or half the swept diameter), is less than the pitch ratio at the tip.

In accordance with the invention, an impeller configuration has been discovered that provides efficient axial flow in the turbulent flow regime, and inhibits the tendency for the flow discharge to become radial in the transitional regime (while maintaining efficient operation under transitional flow conditions). The blades of the inventive impeller have twist to the extent that provides an over pitch condition. This condition is manifested by the pitch ratio of the blades near the hub (at 0.4 R) being greater than the pitch ratio at the tip. Further, in accordance with the invention, the radial flow discharge inhibition property of the impeller in the transitional regime and to the laminar flow regime is enhanced by the use of a blade angle at the tip which is larger than in the conventional axial flow impeller and preferably is in the range from 18° to 30°. A further feature of the invention is to use a pair of impellers which are dependent (coupled so that the total power needed to drive the pair is less than the sum of the power to drive each impeller individually under the same conditions). Such dependent relationship preferably is obtained by spacing of the impellers at less than a diameter of the larger of the pair. This arrangement enhances the axial flow and further inhibits the radial discharge in the transitional and laminar regimes. A further feature is to provide the blades of the impeller with different blade angles at the tip. Thus, the impeller may be a four-bladed impeller where two of the diametrically opposite blades are at a first pitch angle, while the other two diametrically opposite blades (90° apart from the first two) are at a different blade angle at their tip.

Without limiting the invention to any theory of operation, it is believed that the over pitch condition and the use of different blade angles at the tip of the impellers inhibits the tendency for the discharge flow from the impeller to be radial, and enhances axial flow, by causing asymmetries which give rise to oscillations in the flow velocity, much like inherently exist in the turbulent flow regime. Such oscillations are shown in data presented in a paper by Ronald J. Weetman, et al., entitled "Power Flow and Shear Characteristics of Mixing Impellers" presented at the Sixth European Conference on mixing, Pavia, Italy, May 24-26, 1988.

Accordingly, it is the principal object of the present invention to provide improved impellers and impeller systems which afford better mixing and more rapid and effective blending than conventional axial flow impeller systems not only in the turbulent flow regime, but also in the transitional and into the laminar flow regime.

It is a further object of the present invention to provide improved mixing impellers which afford efficient mixing and blending over a wide range of flow conditions (with viscous and less viscous liquids and liquid suspensions) and which require a more limited range of impeller sizes than is the case with conventional axial flow mixing impellers.

The foregoing and other objects, features and advantages of the invention, and the design of impellers and impeller systems in accordance with presently preferred embodiments thereof, will become more apparent from a reading of the following description in connection with the accompanying drawings in which.

Figure 14:
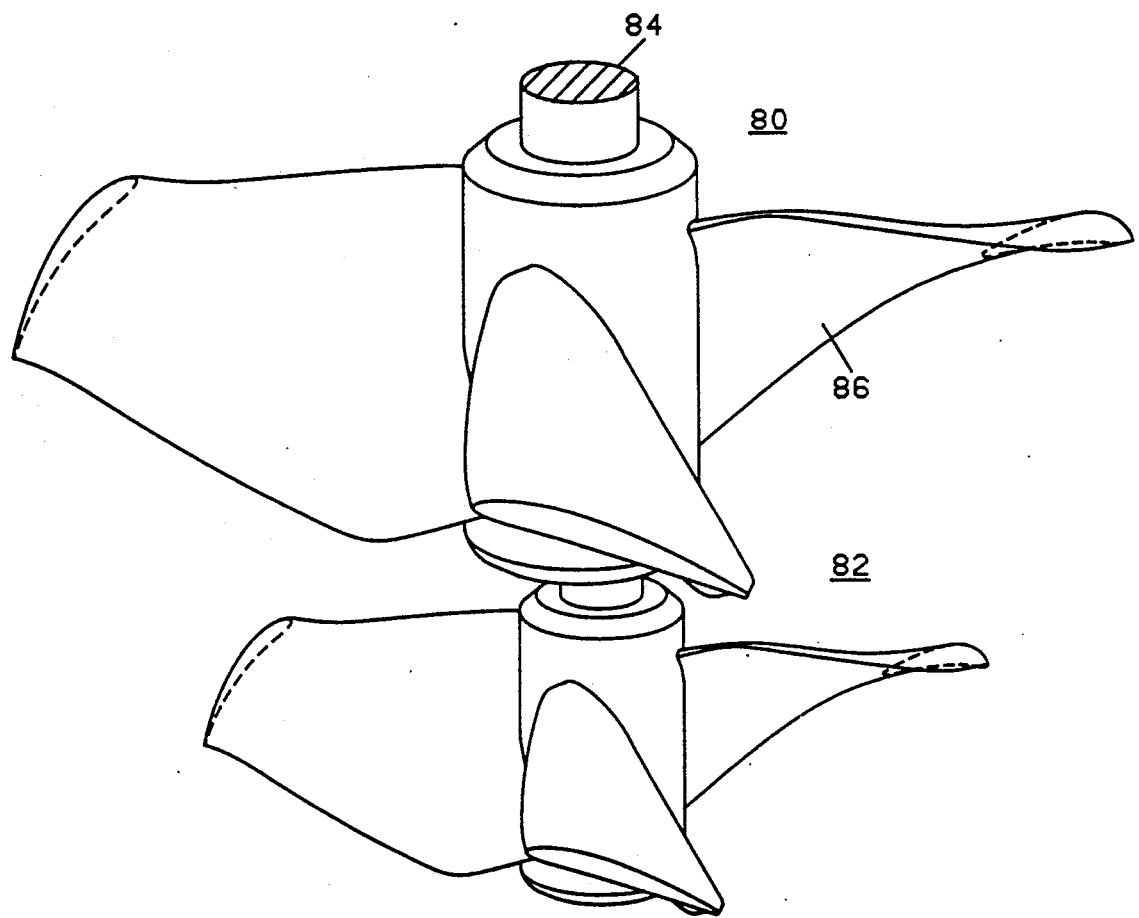
Figure 15:
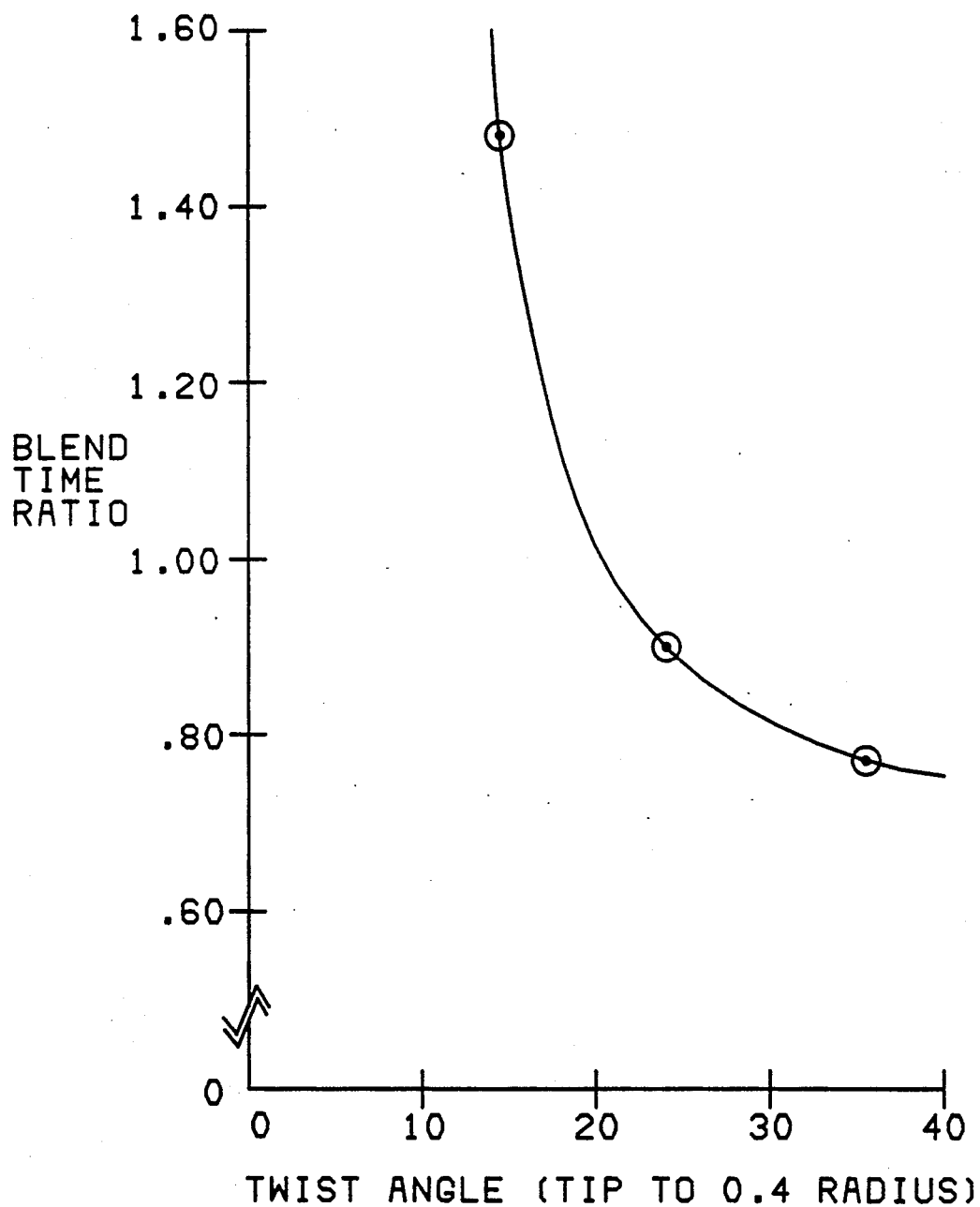

FIG. 14 is a perspective view of an impeller system in accordance with the invention and particularly a pair of impellers, one of larger diameter and one of smaller diameters, similar in shape to the impellers shown in FIGS. 1 through 5 and which are in dependent relationship; and FIG. 15 is a curve showing the blend time ratio (as compared to a standard A100 impeller obtained with a seven inch impeller as shown in FIGS. 1 through 5 in a medium which presents a mixing Reynolds number of approximately 200, the test set-up being similar to that used and described in the Nov., 1989 paper by Ronald J. Weetman, et al. entitled "The Use of Fluidfoil Impellers in Viscous Mixing Applications" which is referenced above.

Referring to FIGS. 1 through 5, there is shown a mixing impeller 10 having three blades 12, 14 and 16 assembled 120° apart on a hub 18 which is attached to a shaft 20. The blades may be attached to the hub by bolts and brackets when the blades are made of metal. Preferably, the blades and hubs are integrally molded of composite material such as fiber reinforced plastic, for example by injection or compression molding of compounds containing fibers and plastic resin. The mold, therefore, defines the shape of the blades and the hub. The hub may be attached to the shaft 20 which extends to a motor directly or via drive gears. The motor and shaft may be part of the assembly of a portable mixer which may be clamped to walls of a tank containing the liquid or liquid suspension to be mixed. Alternatively, the motor and its drive assembly with the shaft depending therefrom, may be supported by a stand or other support mechanism.

Figure 1:
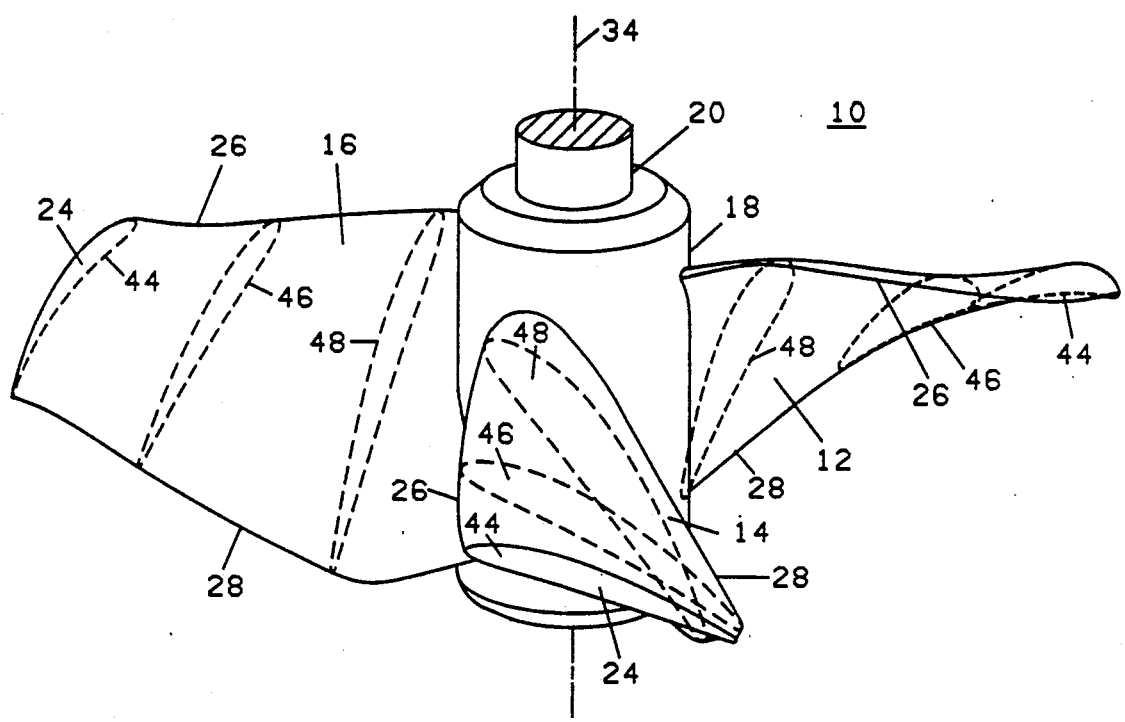
FIG. 1 is a perspective view of a mixing impeller which embodies the invention.
Figure 2:
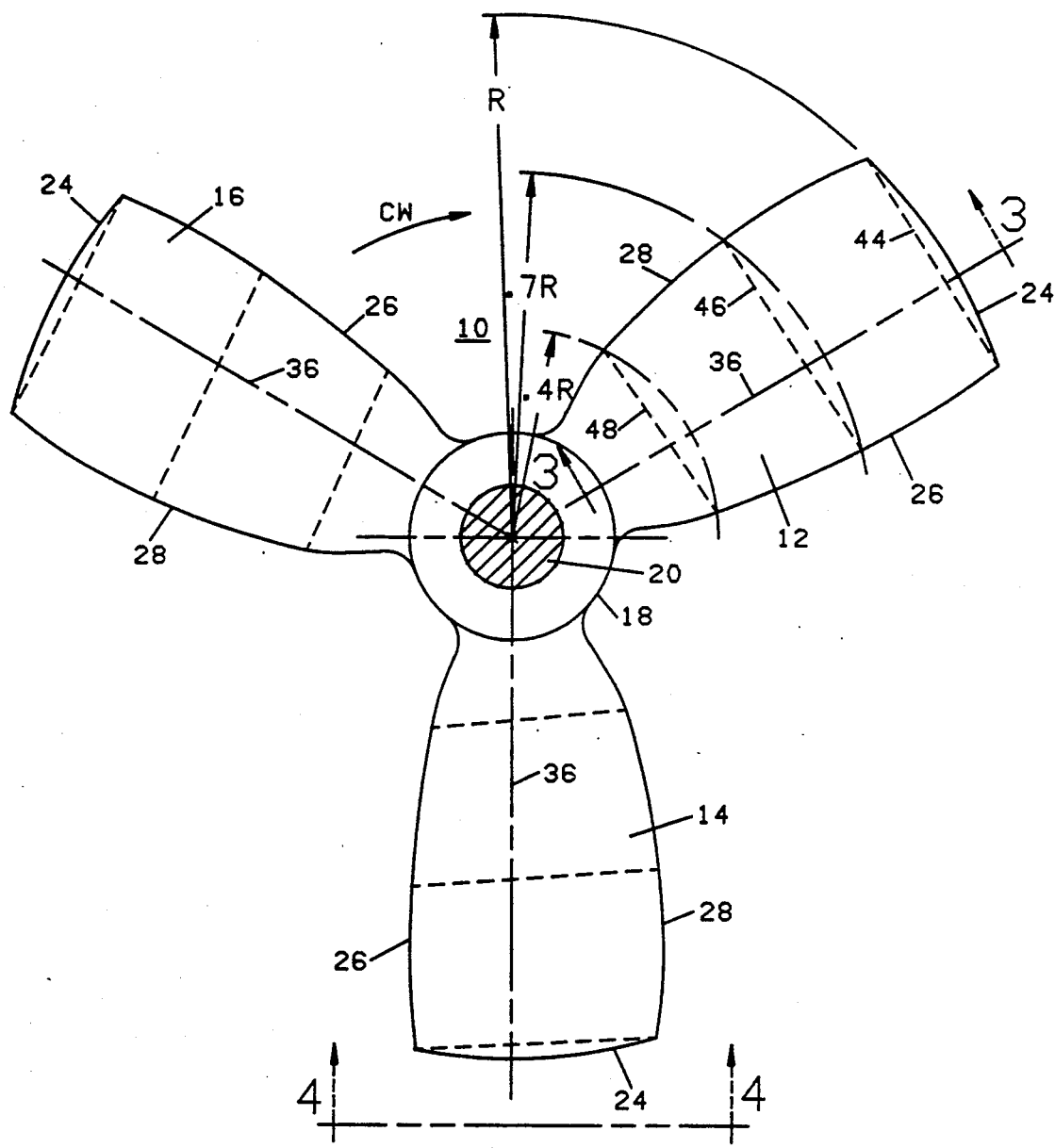
FIG. 2 is a plan view of the impeller shown in FIG. 1.
Figure 3:
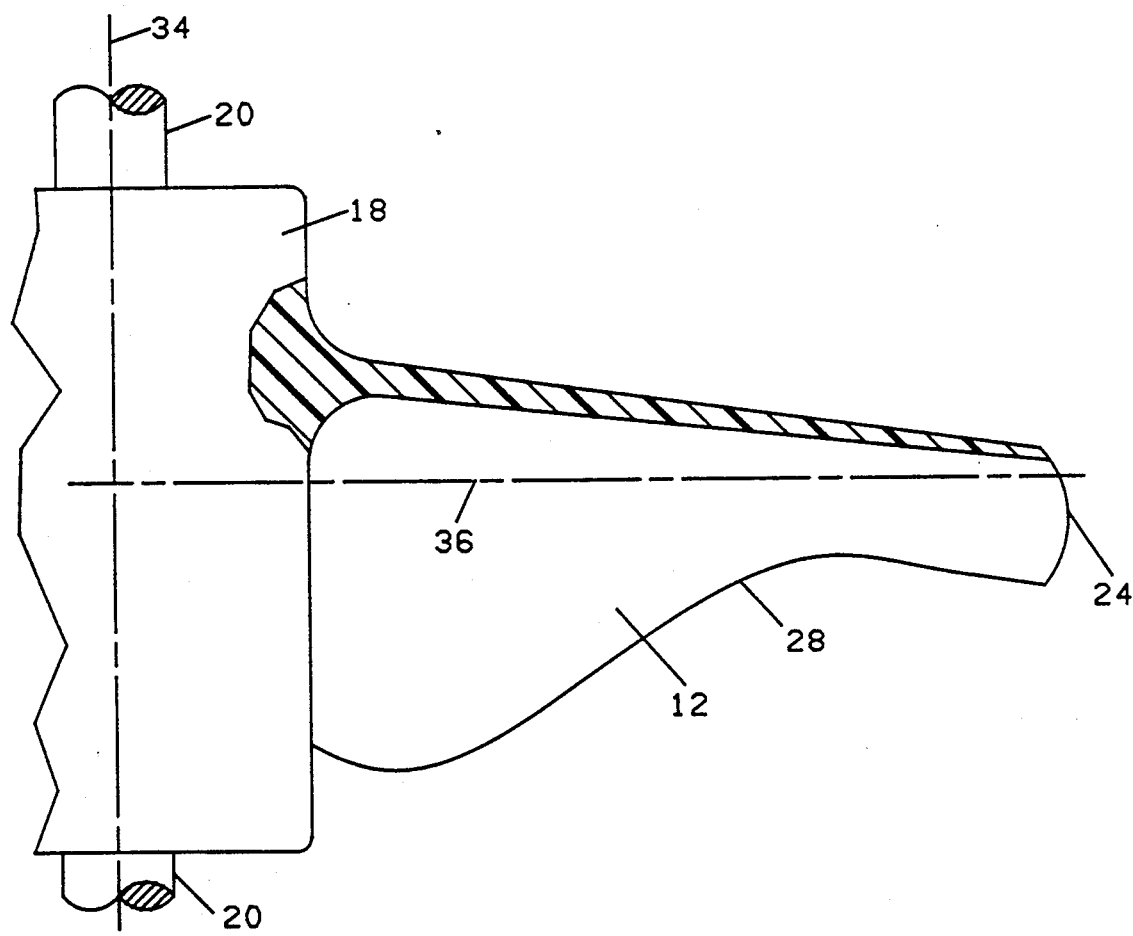
FIG. 3 is an elevational view of the impeller shown in FIGS. 1 and 2, which is partially in section along one blade of the impeller, the section being taken along the line 3—3 in FIG. 2.
Figure 4:
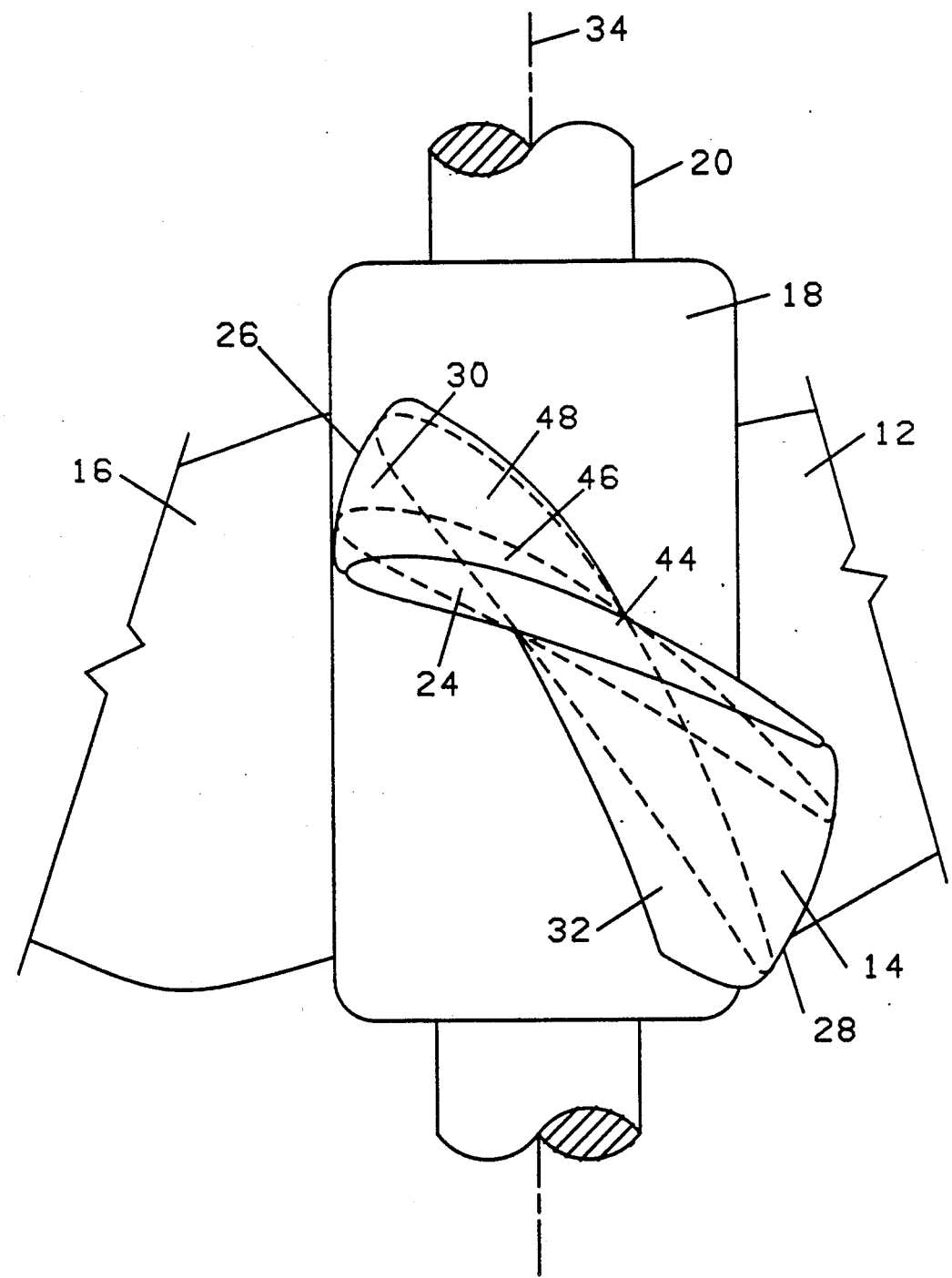
FIG. 4 is an end view of the impeller shown in FIGS. 1-3.
Figure 5:
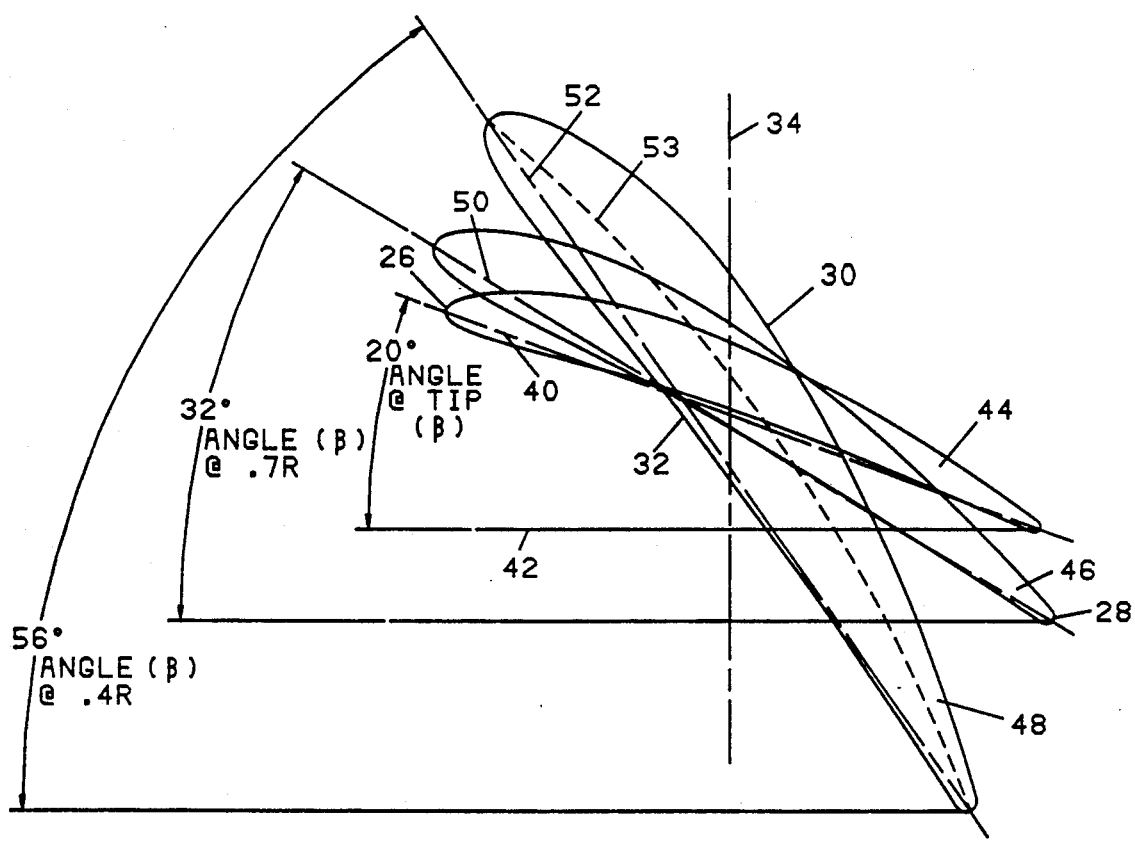
FIG. 5 is a view showing sections through various foils of the impeller at a different radial distances from the impeller axis, namely at the tip, at 0.7 R (where R is the radial distance from the tip to the axis—i.e., the impeller diameter $D_7$ divided by two) and 0.4 R, the view showing the twist of the impeller.

Each of the blades 12, 14 and 16 is identical. The blades have tips 24 which may lie along a circumference of a circle defining the swept diameter of the impeller. The blades also have leading edges 26 and trailing edges 28. The blades are fluidfoils and have camber and twist except along about 10% of the radial length of the blades adjacent to the tips (see FIG. 6). This enables the tip end of the blade to be cut back so as to shorten the diameter of the impeller if desired thereby reducing the number of sizes of impellers which need to be molded. The blades may be further extended with constant pitch angle beyond (e.g., a further 10%) their nominal radial length R. The fluidfoil blades have opposite top and bottom surfaces 30 and 32 which are the low pressure and high pressure surfaces of the blades. The high pressure or pressure surface of the blade is the surface facing the direction in which the fluid is driven. Accordingly, when the impeller is rotated in a clockwise direction about the axis 34, an axial flow is produced in the downward direction (downward pumping) in the medium in the tank. Lines 36 extending radially from the center of the shaft. These lines 36, define the blade axes where maximum camber point on the chord (40) is approximately located. The maximum camber is located at approximately the 40% point (from the leading edge) of the chord (FIG. 5). The chord is drawn between points where the mean line through the blade cross-section intersects the leading and trailing edges (See mean line 53 in the foil 48 in FIG. 5). The blade or pitch angle is the angle between the chord and a plane perpendicular to the blade axis 34. A line 42 in FIG. 5 is in this plane. The three foil shapes shown in FIG. 5 represent cross sections through the leading 26 and trailings edge 28 points at swept radius of R, 0.7 R and 0.4 R as shown in FIG. 2. Foils at the tips is shown at 44. The foils at 0.7 R are shown at 46 and the foils at 0.4 R are shown at 48. The chords at the tip are shown at 40 and the chords 50 & 52 in the foils 46 at 0.7 R and 48 at 0.4 R are shown. Patterns for forming the molds for fabricating the impeller may be constructed by laminating or sandwiching together a series of foils of shapes covering the transitions between the foils 44, 46 and 48 or using stereo lithography techniques.

The width of the blade increases from the tip to 0.4 R and then decreases to form transition between the blades and the hub 18. The principal working surface of the blades is from the tip to 0.4 R. It is in this working surface where the twist providing the over pitch condition occurs.

The twist as defined as the difference between the blade angle at the tip and at 0.4 R and is defined by the following equation:

$$\Delta\beta = \tan^{-1}\frac{PR^1}{0.4\pi} - \tan^{-1}\frac{PR}{\pi}$$

where PR' is the pitch radio at 0.4 R and PR is the pitch ratio at the tip. The Pitch ratio at 0.4 R is greater than the pitch ratio at the tip to afford the over pitched condition.

Preferably, the twist, delta beta, is between 34° and 38°. The twist may be in the range from 30° to 45°. The blade angle at the tip, also known as the tip chord angle (TCA) is preferably 20° and may be in the range from 18° to 30°.

The width of the blade increases smoothly from the tip to 0.4 R. This smooth increase in width has been found to improve the efficiency of the impeller under turbulent flow conditions. In terms of the ratio of the length of the chord to the diameter of the impeller at the tips, the width variation is preferably 0.25 at the tip to 0.33 at 0.4 R. This is a variation in width of approximately 30%. The width variation may be in the range from about 0.15 at the tip to 0.40 at 0.4 R.

The thickness of the blades may also vary increasing from the tip to the base of the blades at the hub 18. As a function of the ratio of the maximum distance between the low and high pressure surfaces 30 and 32 to the chord length, the thickness is preferably 0.1 at the tip and 0.14 at 0.4 R. The blades may, however, be approximately equal thickness throughout their length. The thickness of the blade may increase to 0.22 in terms of the ratio of the maximum distance between the pressure surfaces 30 and 32 to the chord at 0.4 R, and for the remaining length of the blade to the hub when it is desired to strengthen the connection of the blades to the hub. Such strengthening may be desirable under conditions where a motor directly drives the shaft which drives the impeller. While three blades are shown, there is no limitation on the number of blades.

The camber of the blades as expressed as the ratio of the maximum distance from the mean line (shown by way of example as the line 53 through the foil 48 in FIG. 5) to the chord divided to the chord length, may be preferably constant, and in a preferred embodiment is approximately 6%.

Figure 6:
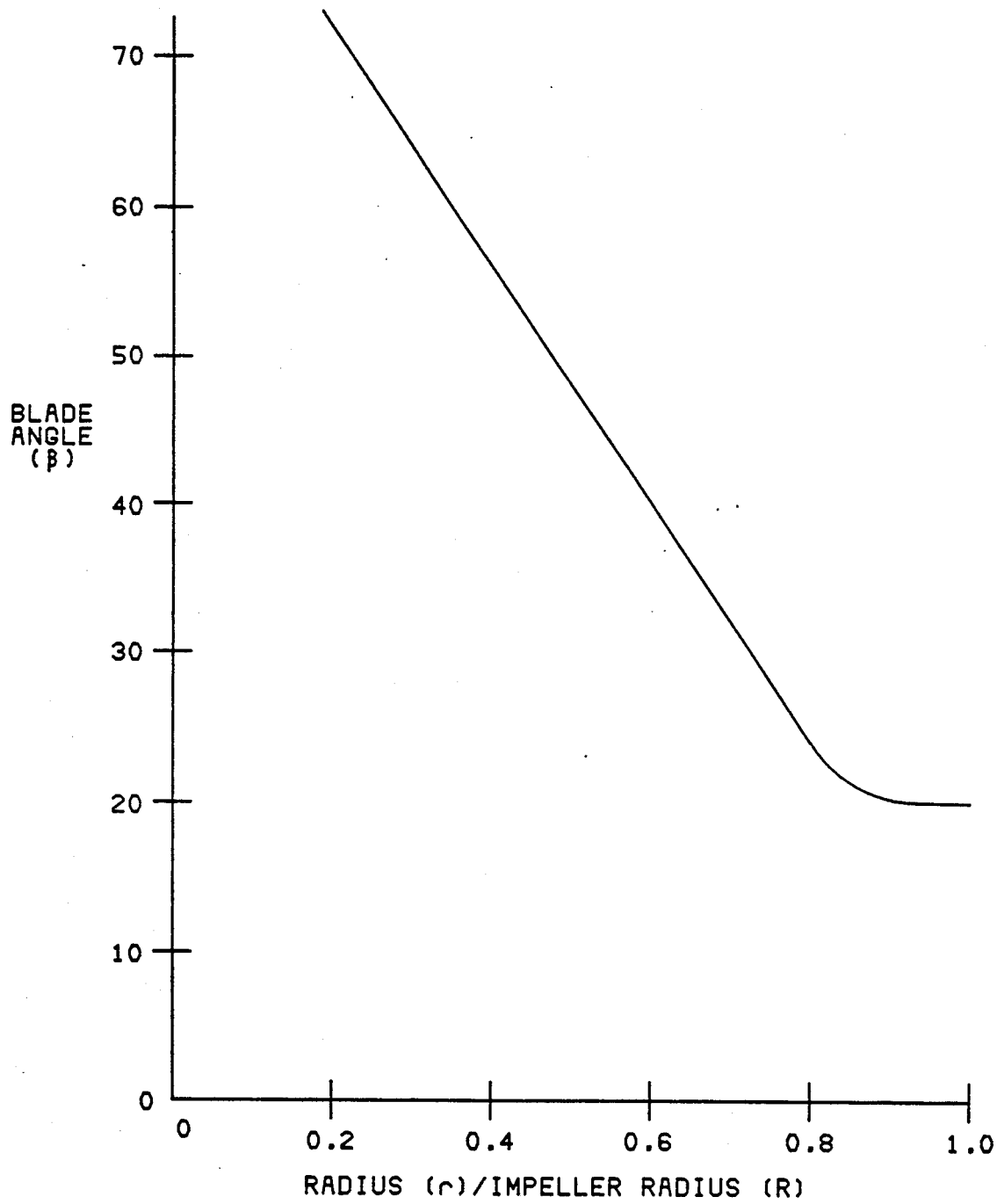
FIG. 6 is a graph also showing the twist of the impeller in terms of the blade or pitch angle (the angle of the chord through a section to the radius)

The blade angle, beta, varies in accordance with the twist. The variation may be smooth as shown in FIG. 6 for the preferred embodiment illustrated in FIGS. 1 through 5.

The surprising results obtained through the use of sufficient pitch to provide an over pitched condition is illustrated in FIG. 15. There, the blend time is compared to a marine propeller type impeller, the A100. It is seen that as the twist increases, the blend time ratio dramatically decreases. This result may be observed using an experiment similar to the one described in the Weetman, et al. article on viscous mixing applications. The colored tracer shows how the flow is maintained more axial than a conventional impeller in spite of transitional and laminar flow conditions in the tank, such that blending is not sluggish.

Figure 7:
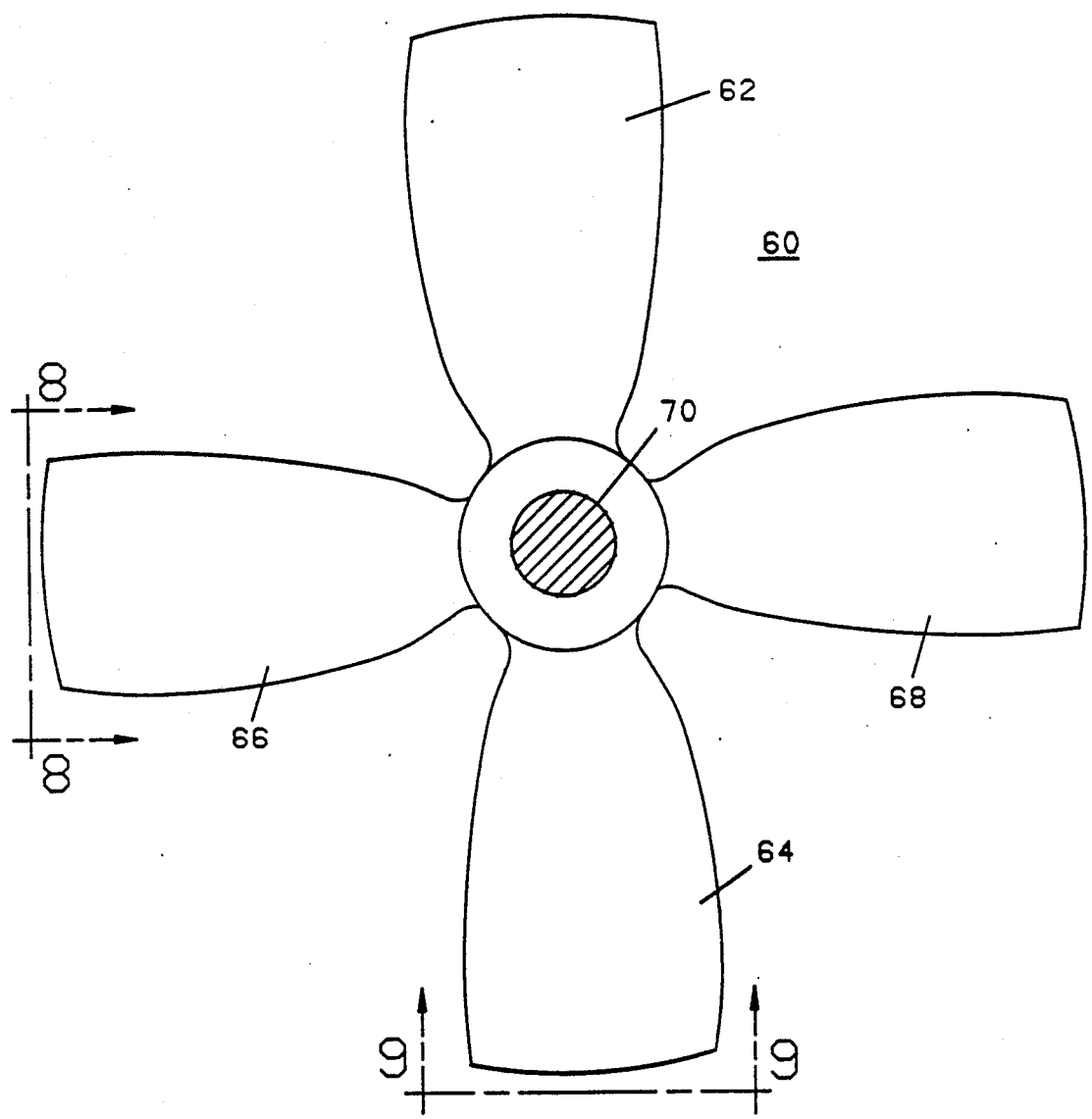
FIG. 7 is a plan view of a mixing impeller in accordance with another embodiment of the invention.
Figure 8:
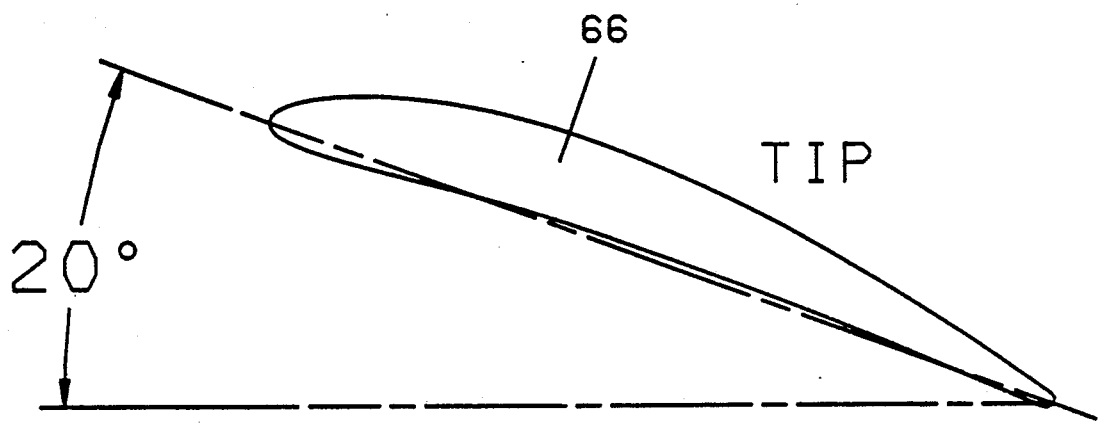
FIGS. 8 and 9 are end views illustrating the different blade angles at the tips of each pair of impeller blades of the impeller shown in FIG. 7.
Figure 9:
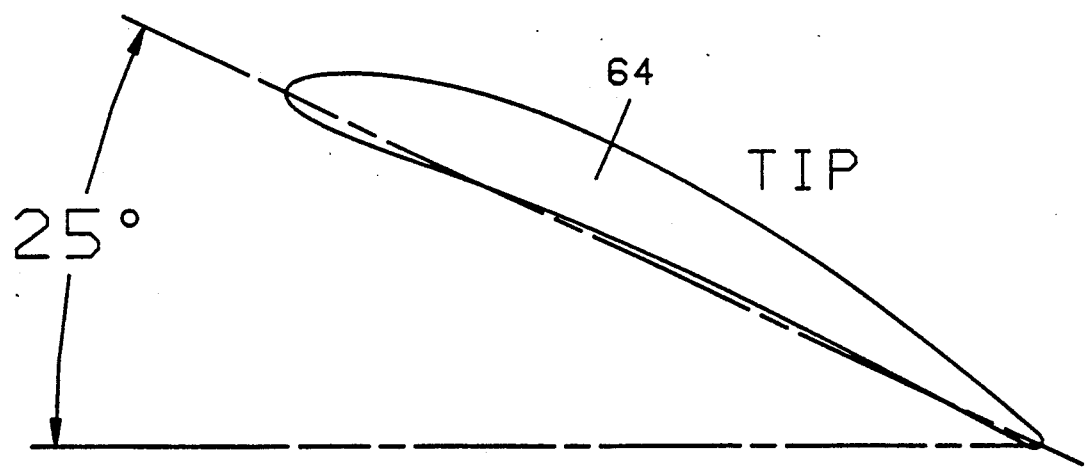

Referring to FIGS. 7, 8 and 9, there is shown a mixing impeller 60 having a first pair of blades 62 and 64 disposed diametrically opposite to each other and a second pair of blades 66 and 68 also disposed diametrically opposite to each other. The shape of these blades may be similar to the shape of the blades 12, 14 and 16. The first pair of blades 60 and 62 are spaced 90° from the blades 66 and 68. However, their tip chord angles are different. The pair of blades 66 and 68, as shown in FIG. 8 for the blade 66, have a smaller tip chord angle than the blades 62 and 64. This angle is, for example, 20° in the case of the blades 66 and 68 and 25° in the case of the blades 62 and 64. The diametrically opposed blades have the same tip chord angle in order to reduce fluid forces acting to bend the shaft 70 of the impeller. The different angular orientations cause asymmetry in the flow pattern produced by the impeller 60 and further prevents the formation of vortices in the transitional and laminar flow regimes.

Introducing asymmetries provide improved mixing and blending in the transitional flow in the mixing tank. This is because when the flow around the immediate vicinity of the impeller is in transitional flow, the other parts of the tank can be in laminar flow. When there is laminar flow in parts of the tank, stationary vortices or circulation patterns will be set up that inhibit mixing, and particularly blending, which does not occur or takes place very sluggishly in these areas. This effect is shown in the above-referenced 1989 publication authored by R. J. Weetman et al. It is, therefore, important to introduce asymmetries in the flow field to distribute stationary circulation patterns or vortices. The improved impellers are over pitched and, in the embodiment of FIGS. 7-9, also have different tip chord angles to obtain this important function. Asymmetries in the flow field may also be introduced by providing the opposite pairs of blades with different twist, camber and/or length. The difference may be of the same order of magnitude as illustrated in FIGS. 7-9, wherein the tip chord angle in one pair of blades 62, 64 and of the other pair 66, 68 increases the driving power for the pair 62,64 about 25%-50% over the power for driving the other pair 66, 68. Although the above discusses similar blade characteristics for opposite pairs of blades, each blade of each pair may differ (e.g., in tip chord angle or any other characteristic) as long as the fluid forces did not limit the impeller's operation.

Figure 10:
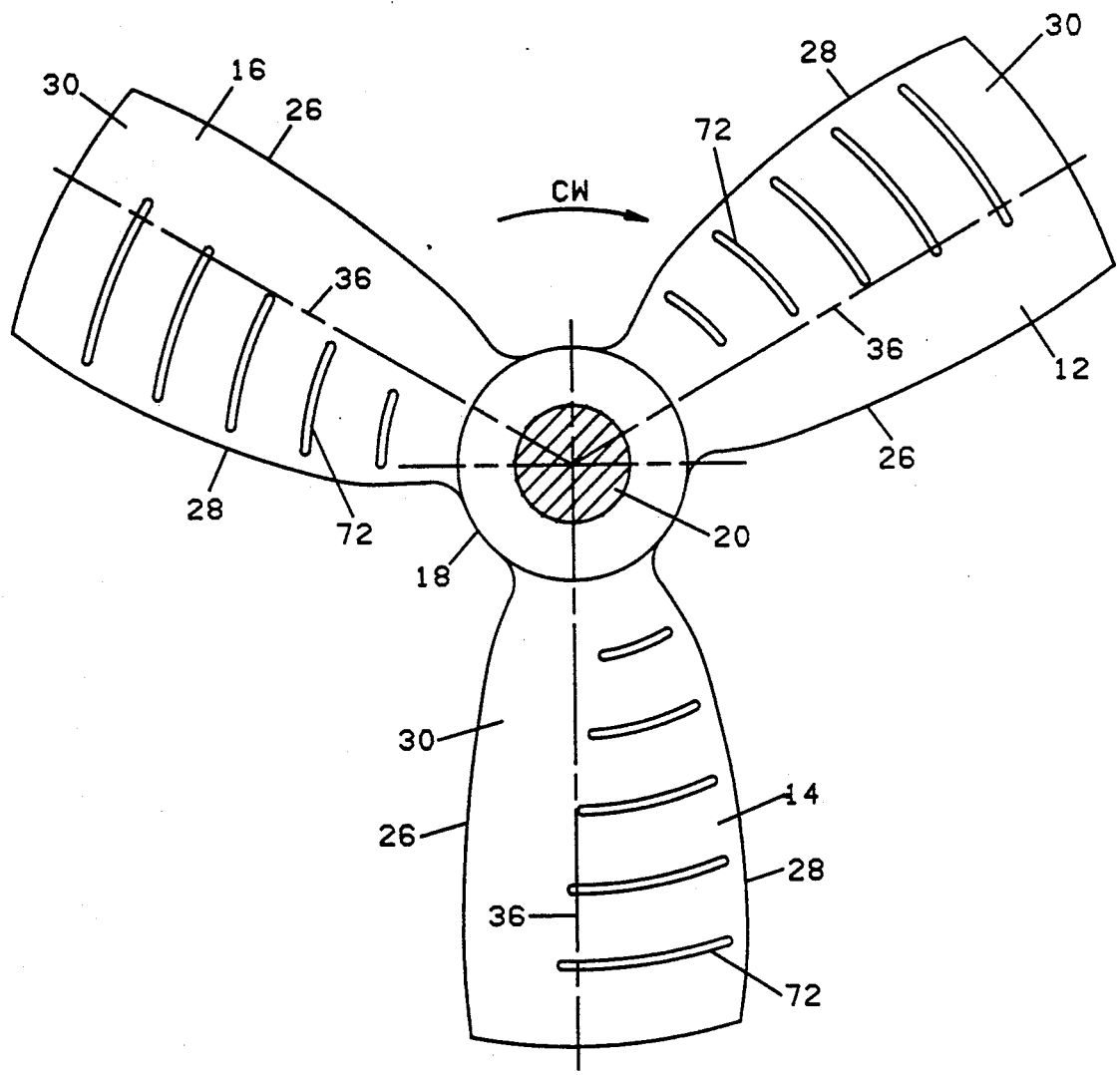
FIG. 10 is a plan view showing an impeller similar to the impeller shown in FIG. 1 to 4 with flow guides on the low pressure (top) surface of the blades.
Figure 12:
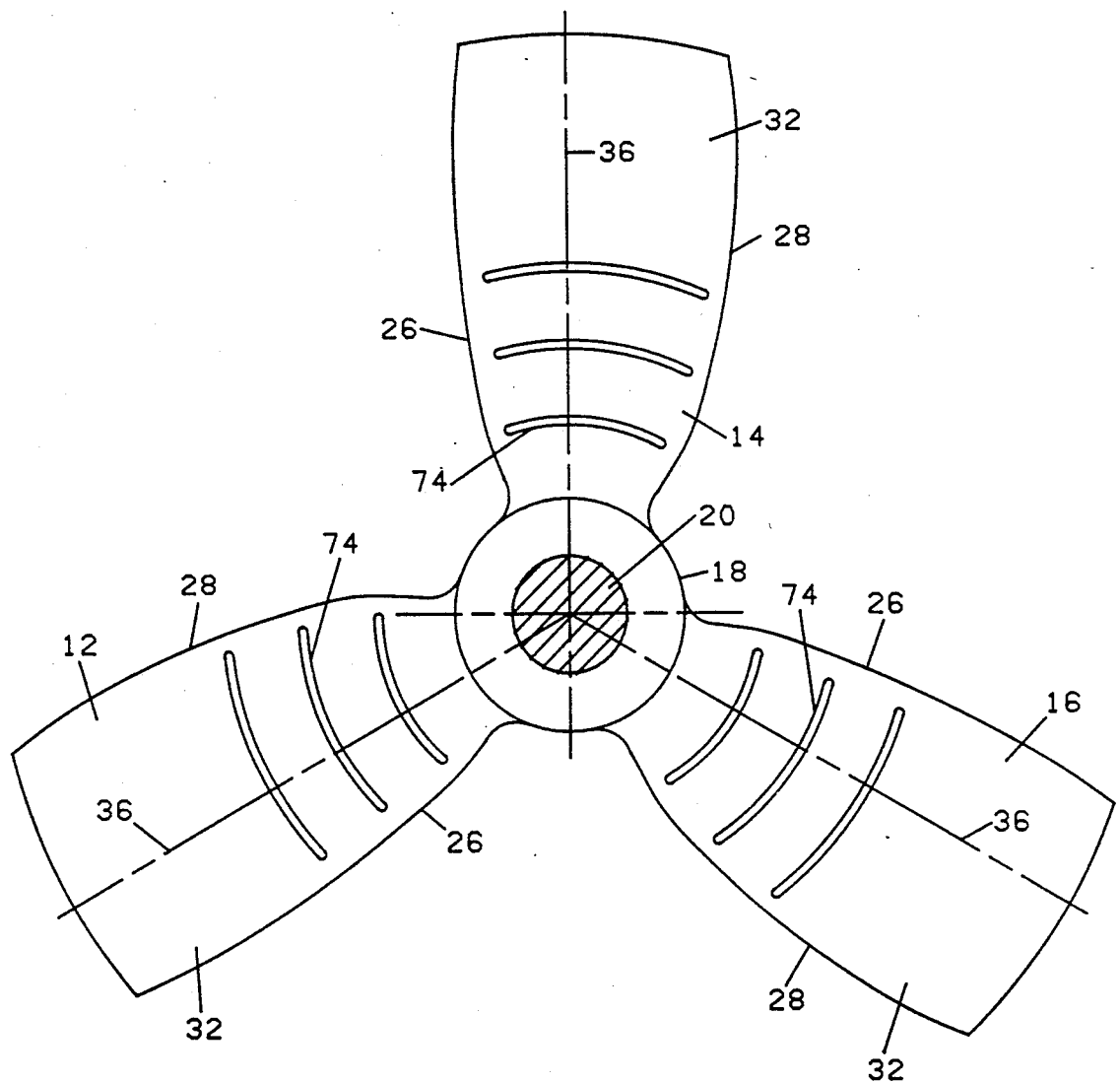
FIG. 12 is a bottom view of the impeller shown in FIG. 10 showing flow guides on the high pressure or bottom surfaces of the blades.
Figure 13:
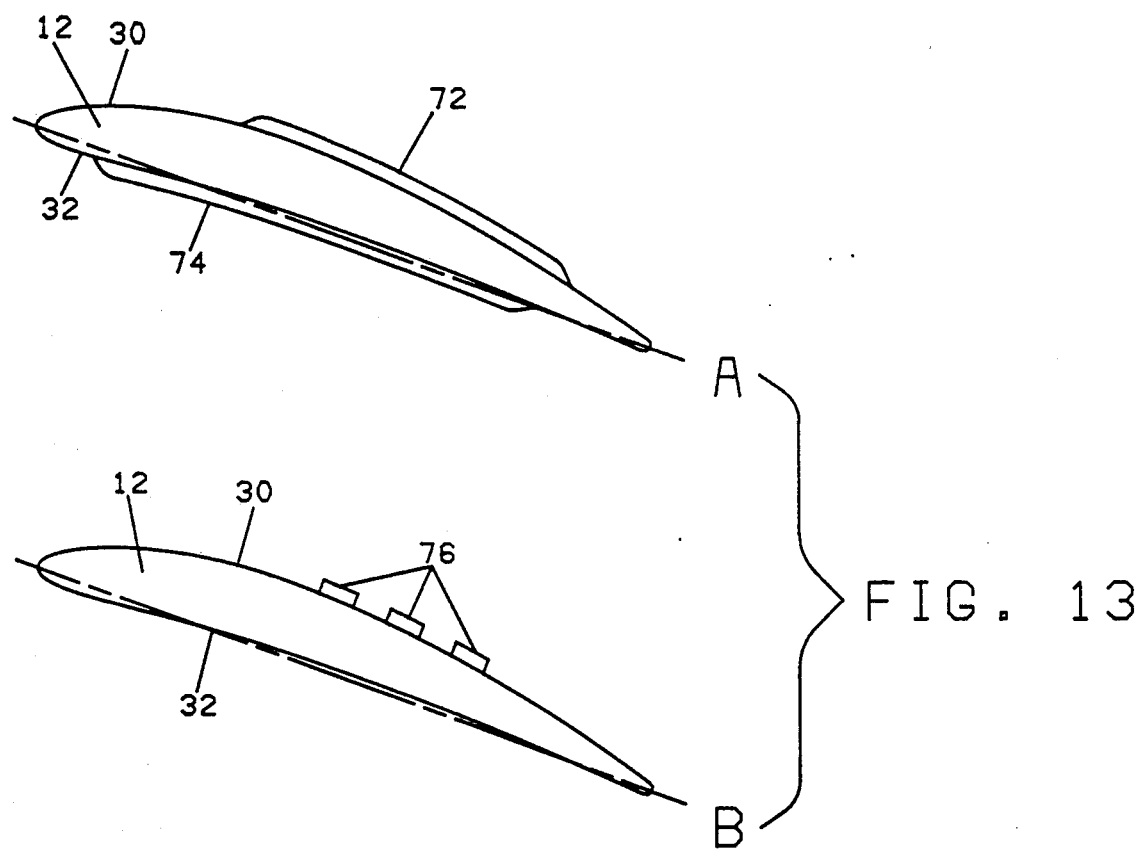
FIG. 13 shows an end view of the impeller shown in FIGS. 10 and 12 and an end view of the impeller shown in FIG. 11.

FIGS. 10, 12 and 13A show impellers of similar design to the impellers shown in FIGS. 1-5 and like parts are designated with like referenced numerals. A plurality of ribs 72, 74 which lie along circles centered at the axis of rotation of the shaft 20, define flow guides. The ribs 74 on the bottom or high pressure surface 32 extend on both sides of the blade axes 36. They inhibit the strong radial flow that occurs near the hub in the transitional flow regime. The ribs 72 on the upper surface 30 of the blades are substantially entirely between the blade axes 36 and the trailing edges of the blades. These guides further inhibit radial flow and separation in the turbulent flow regime.

Figure 11:
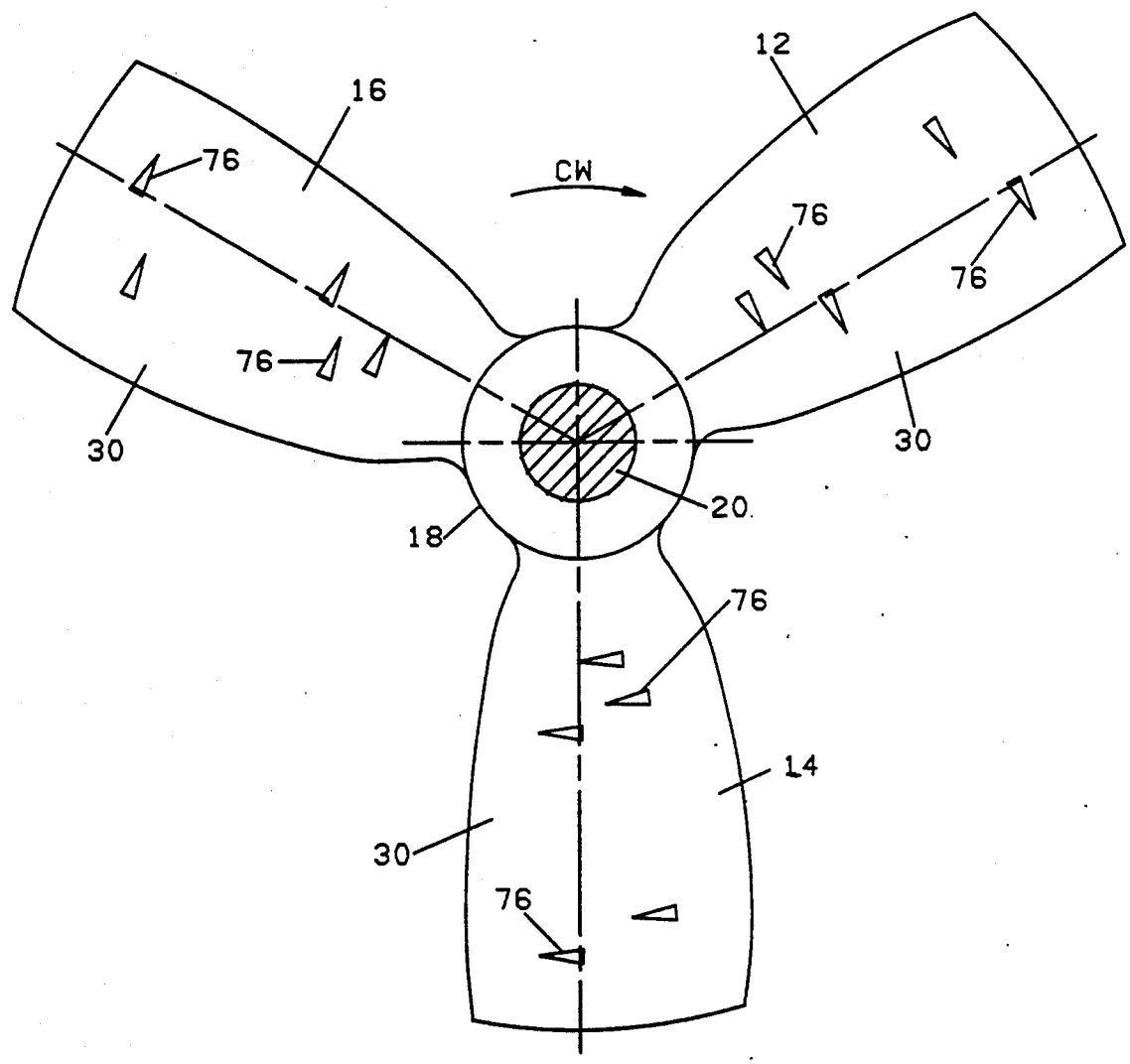
FIG. 11 is a view similar to FIGS. 10 showing the use of turbulence generator wedges on the low pressure (top) surface of the blades.

FIGS. 11 and 13B shows an impeller similar to the impeller shown in FIGS. 1 to 5, and like parts are identified by like referenced numerals. A plurality of turbulence generating wedges 76 are disposed on the top low pressure side of the blades. These projections reduce the chance of separation of the flow and generate turbulence which enhances mixing in the turbulent flow regime. Instead of wedges, riblets may be used. The wedges may be combined with the flow guides which are shown in FIG. 12. The flow guides are provided by the plurality of ribs 74 on the high pressure surfaces 32 (see FIG. 13A). The turbulence generating wedges 76 are shown on the low pressure surfaces 30 in FIG. 11 and also in FIG. 13B.

Referring to FIG. 14, there are shown a larger diameter impeller 80 and a smaller diameter impeller 82 coaxially mounted on a common drive shaft 84. These impellers each have three blades and the blades are generally in alignment with each other. The shape of the blades is preferably as described in connection with FIGS. 1 to 5. The blades are spaced sufficiently close together in axially separation along the shaft 84 as to be dependent. Dependency of operation is shown when the addition of the second impeller does not require a significant increase in driving power in order to rotate both impellers. For example, if the impellers were spaced apart more than one diameter of the larger impeller, the amount of power required to drive both impellers would be approximately the sum of the power required to drive each individually. Dependent impellers require, for the same flow velocity, similar or less power than for a single impeller alone. The impeller in the outlet flow (the lower, smaller impeller 82 in FIG. 14) changes the flow pattern for the upper impeller. In transitional and laminar flow regimes, where the discharge flow produced at the high pressure surfaces 86 of the upper impeller 80 tends to change to radial flow, because of the change in flow pattern produced by the lower smaller impeller, this radial flow is inhibited. The total flow pattern remains axial for a longer axial distance than would be the case for either impeller 80 and 82 alone. Accordingly, the use of the smaller impeller further enhances the axial flow characteristics of the impeller system.

In a preferred embodiment, the upper impeller diameter is seven inches and the lower impeller diameter is five inches; both impellers providing an axial outlet flow in the downward direction as viewed in FIG. 14. The spacing between the impellers is approximately one-half the diameter of the upper impeller (3.5 inches). The dual impeller system provides an increase in flow number $N_Q$ of approximately 60% and a reduction in power number $N_P$. For a definition of $N_Q$ and $N_P$, see the above referenced article by Weetman, et al. on viscous mixing applications. While the impellers are shown with their blades in alignment, the blades may be staggered if desired. It may be advantageous to locate the smaller impeller above the larger impeller. These advantages may also be obtained in up-pumping as well as in the illustrated down-pumping examples.

From the foregoing description, it will be apparent that there has been provided improved mixing impellers and impeller systems which provide efficient operation in the turbulent flow regime, the transitional flow regime and into the laminar flow regime. Variations and modifications of the herein described impellers and impeller systems within the scope of the invention will undoubtedly suggest themselves to those skilled in the art. Accordingly, the foregoing description shall be taken as illustrative and not in a limiting sense.

I claim:

1. An impeller which produces flow ranging from turbulent to laminar flow in bodies of liquid and liquid suspensions and which is effective in mixing and blending such bodies, said impeller comprising a plurality of blades rotatable about an axis, said blades having tips which define the radius (R) of said impeller, said blades extending from said tips radially toward said axis, said blades having twist defined by inclinations thereof with respect to a plane perpendicular to said axis at angles which increase smoothly along said blades toward said axis to provide an over pitched condition, where the pitch ratio (PR) of the blades at a section thereof spaced 0.4 R from said axis is greater than PR at said tips, where PR is defined by the following equation:

$$PR = \frac{r}{R} \pi \tan\beta \frac{r}{R}$$

where r is the radius from the axis of rotation to the section where PR is computed in accordance with said equation, and $\beta$ is the angle of inclination at said section in degrees.

2. The impeller according to claim 1 wherein the twist ($\Delta\beta$) is defined by $$\Delta\beta = \tan^{-1}\frac{PR^1}{0.4\pi} - \tan^{-1}\frac{PR}{\pi}$$

where PR' is the pitch ratio at a radial distance of about 0.04 R and PR is the Pitch ratio at the tip and PR' is greater than PR.

3. The impeller according to claim 2 wherein $\Delta\beta$ is in the range of 30° to 45°.

4. The impeller according to claim 2 where $\Delta\beta$ is about 34°-38°.

5. The impeller according to any of claims 1-4 where the inclination of the blades at their tips is in the range of 18°-30°.

6. The impeller according to any of claims 1-4 when the inclination of the blades at their tips is about 20°.

7. The impeller according to any of claims 1-4 where the inclination of said blades is invariant for approximately 10% of the radial distance from their said tips to said axis.

8. The impeller according to any of claims 1-4 where said blades are fluidfoils having camber as well as said twist, said pitch blade angles are measured between chords of said blades at a point at said tips and at a point at 0.4 R.

9. The impeller according to claim 8 wherein said blades have leading and trailing edges and said point at said tip and at 0.4 R are at said leading edge.

10. The impeller according to claim 9 wherein said chords at said tip extend between points at intersections of radial lines of length R from said axis and said leading and trailing edges, and said chords at 0.4 R, and between intersections of radial lines of length 0.4 R from said axis and said leading and trailing edges.

11. The impeller according to claim 8 wherein said blades increase smoothly in width between the tips and regions at about 0.4 R thereof.

12. The impeller according to claim 11 wherein said width of said blades increases about 30% between the tip and 0.4 R thereof.

13. The impeller according to claim 11 wherein said width of said blades increases such that the ratio of differential of the length of said chord to the diameter of said impeller at said tip and at 0.4 R varies over a range from about 0.15 to 0.4.

14. The impeller according to claim 11 wherein the width of said blades in terms of the ratio of the length of said chord (W) to the diameter (D) of said impeller (W/D) at their said tips is about 0.25 at the tips, and at 0.4 R is about 0.33.

15. The impeller according to claim 8 wherein said blades vary smoothly in maximum thickness, as measured between opposite surfaces of said blades, between said tip and 0.4 R over a range of about 0.04 to 0.12 in terms of the ratio of said thickness to the lengths of said chords at said tip and 0.4 R respectively.

16. The impeller according to claim 15 where the ratio of said thickness to the length of said chord at said tip is about 0.1, and the ratio of said thickness, to the length of said chord at 0.4 R is from about 0.14 to 0.22.

17. The impeller according to claim 8 wherein said camber, as a percentage of chord length, is approximately constant from said tip to 0.4 R along said blades.

18. The impeller according to claim 17 wherein said camber is about 6%.

19. The impeller according to any of claims 1-4 wherein said blades have opposite surfaces which respectively produce relatively high and relatively low pressure in said bodies, and projections defining flow guides on said surfaces.

20. The impeller according to claim 19 wherein said projections are a plurality of ribs spaced from said axis and along segments of circles at different radial distances from said axis.

21. The impeller according to claim 20 wherein said blades have leading and trailing edges, and said ribs on said surfaces are spaced from said edges.

22. The impeller according to any of claims 1-4 wherein said blades have opposite surfaces which develop relatively low and relatively high pressures in said bodies, and means for generating turbulence disposed on said low pressure surfaces.

23. The impeller according to claim 1 wherein said blades have opposite surfaces which develop relatively low and relatively high pressures in said bodies, means for generating turbulence disposed on said low pressure surfaces which comprises a plurality of wedges projecting from said low pressure surfaces.

24. The impeller according to any of claims 1-4 wherein a parameter of said blades selected from the group consisting of inclination, camber, twist, width and length of at least one of said plurality of blades is different from the inclinations of the others of said plurality of blades.

25. The impeller according to claim 24 wherein said impeller has a plurality of pairs of blades which extend along different diametrically lines through said axis, the inclinations of at least one of said plurality of pairs being different from the inclinations of another of said plurality of pairs.

26. The impeller according to claim 25 wherein said impeller has four blades which are disposed generally along diameters of said impeller spaced 90° from each other, the inclinations of the blades along one of said diameters being different from the inclinations of said blades along the other of said diameters.

27. The impeller according to any of claim 1-4 further comprising a second impeller having a plurality of blades rotatably disposed coaxially with said first named plurality of blades and spaced in dependent relationship therewith.

28. The impeller according to claim 27 wherein said blades of said second impeller is smaller in diameter than said first named blades and are otherwise of identical shape.

29. The impeller according to claim 28 wherein said blades of said second impeller are in axial alignment with said blades of said first impeller.

30. The impeller according to claim 27 wherein said first named plurality of blades and the blades of said second impeller have opposite surfaces, which develop relatively low and relatively high pressures in said bodies, said impellers being disposed with the relatively low pressure surfaces of said blades of said second impeller adjacent said relatively high pressure surface, of said first named blades.

31. The impeller according to claim 30 wherein said dependent relationship is provided by said blades of said second impeller being spaced less than the diameter of said first named impeller axially away from said first impeller.

32. The impeller according to claim 31 wherein said spacing is less than one half of the diameter of said first impeller.

* * * * *